United States Patent [19]

Wang

[11] Patent Number: 5,595,480
[45] Date of Patent: Jan. 21, 1997

[54] PROCESS FOR SINTERING INDUSTRIAL WASTE

[76] Inventor: Hsun Wang, No. 37, 114 Lane, Shi Yuan Rd., Jong Lih City, Taur Yuan Hsien, Taiwan

[21] Appl. No.: 331,414

[22] Filed: Oct. 31, 1994

[51] Int. Cl.$^6$ .................................................. F27B 14/00
[52] U.S. Cl. ............................ 432/13; 432/18; 432/24; 432/121; 432/128
[58] Field of Search .................................. 432/13, 18, 24, 432/121, 128

Primary Examiner—Henry A. Bennett
Assistant Examiner—Siddharth Ohri
Attorney, Agent, or Firm—Pro-Techtor International

[57] ABSTRACT

A method for sintering industrial waste into environment conserving stones. The process mixes waste industrial earth and industrial waste in a predetermined ratio, and forms sterile environment protecting stones with high strength by the following processes: vacuum ejection, drying, breaking, screening, separating, sintering, and vibrating screening. The stones can be uses in the construction of civil engineering projects, or used as stone additives in asphalt pavement.

2 Claims, 3 Drawing Sheets

PROCESS FOR SINTERING INDUSTRIAL WASTE

BACKGROUND OF THE INVENTION

1. Field of the Invention

The present invention relates to a method for sintering industrial waste into environment conserving stones, and especially to a method of regenerating the material mixed by waste industrial earth and industrial waste into sterile environment conserving stones with high strength.

2. Description of the Prior Art

Stone used in the industry normally is dug from a stream or from the earth on a mountain, and is broken into desired sizes. These are the so called natural stones, and are provided for constructing bridges, paving roads, and for use as stone fillers in the civil engineering constructions to strengthen the concrete and steel constructions or asphalt pavements. However, the natural stones taken from nature have on their surfaces organic matter and fungus. Thus asphalt is a pavement may be attached by the organic matter and fungus on the surface of the stones, so that the pavement will be damaged and cracked. Ingredients in the natural stones are not uniform. When the stones are broken into small stones, the composition of the stones is altered, i.e., the original strength is greatly lowered. This will reduce the bearing life of the wall of a concrete structure, and thus is a defect of the natural stones.

Nowadays, a sense of environmental conservation is prevailing. Digging of natural stones may cause the soil in the streams to run off, and render ecological environment unbalanced. Digging natural stones thus is not an appropriate practice for the long term.

Waste earth in construction and waste created in the industry as well as commercial businesses increases daily. Waste products are a threat to the environment, so safely disposing of waste earth and industrial waste is increasingly important.

SUMMARY OF THE INVENTION

Therefore, it is an object of the present invention to eliminate the defects mentioned above by recovering waste earth and industrial waste and regenerating them for use without secondary pollution. The recycled waste is used to produce sterile artificial stones with high strength. The stones are to be effectively and beneficially used in the field of construction. The practical process and effect of sintering industrial waste into environment conserving stones will be apparent after reading the detailed description of the preferred embodiments of the present invention in reference to the accompanying drawings.

DETAILED DESCRIPTION OF THE PREFERRED EMBODIMENT

Figure 1:
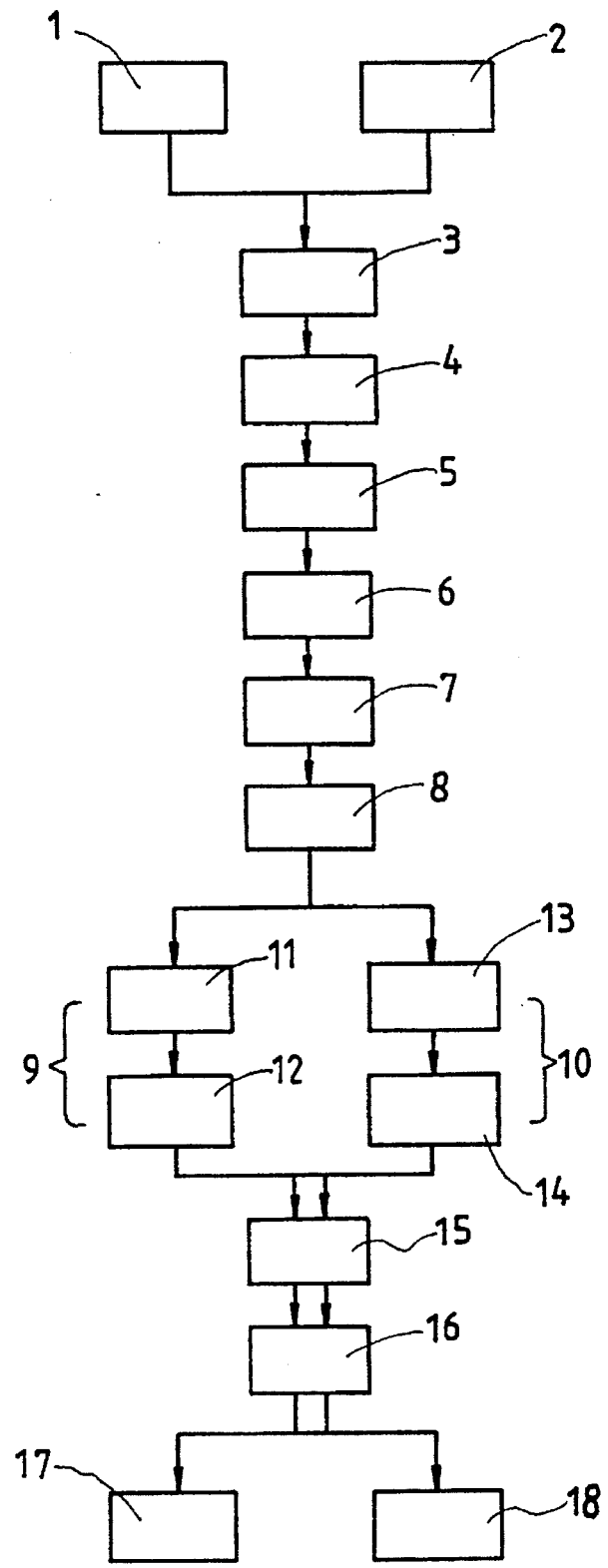
FIG. 1 is the general flow chart of the process of the present invention to sinter industrial waste into environment conserving stones.

Referring to FIG. 1, the material 3 of the present invention is composed of waste earth 1 and industrial waste 2. The waste earth 1 is dug from the earth, hence it contains the ingredients of red earth, black earth, reddish yellow earth and clay, etc. The content of waste earth i in material 3 is preferably about 50%. Industrial waste 2 is a mostly uniform mixture of wood flour, waster paper pulp, waste mud, tea dregs, waste oil, etc. The content of industrial waste 2 in material 3 is also preferably about 50%.

After the material 3, composed of the waste earth 1 and the industrial waste 2, is mixed in a mixer 4, it is milled with a ball mill 5 to reduce the size of its grains, and to render the ingredients therein into a uniform mixture. After ball milling, the mixture is press filtered by a press filter 6 which has the principal function of mixing the material 3 with water in a pressure tank. During this mixing, the residuals of the mixture can be filtered. The aggregating effect of the material can thus be increased. After press filtering, a pugging process 7 is effected to aggregate the material into a solid state, and to remove the bubbles contained therein to strengthen the material.

Next a process using vacuum ejection 8 is effected to form the material into lumps. The lumps can be divided into two types of material.

A first material is broken type 9, while the other is the modelling type 10. The broken type 9 is first treated by a drying process 11, and then is treated by a shattering process 12 to be broken into uniform grains. After shattering, a sintering process 15 takes place. After sintering, the grains are treated by a vibrating screening process 16 to obtain coarse and fine environment conserving stones 17, 18.

The modelling type material 10 is first treated by a modelling process 13 with a modelling machine. The material is coagulated by rotations of the machine, and then is treated by a drying process 14. After that, it is treated directly by a sintering process 15. After sintering, it is treated by a vibrating screening process 16 to obtain coarse and fine environment conserving stones 17, 18.

Figure 2:
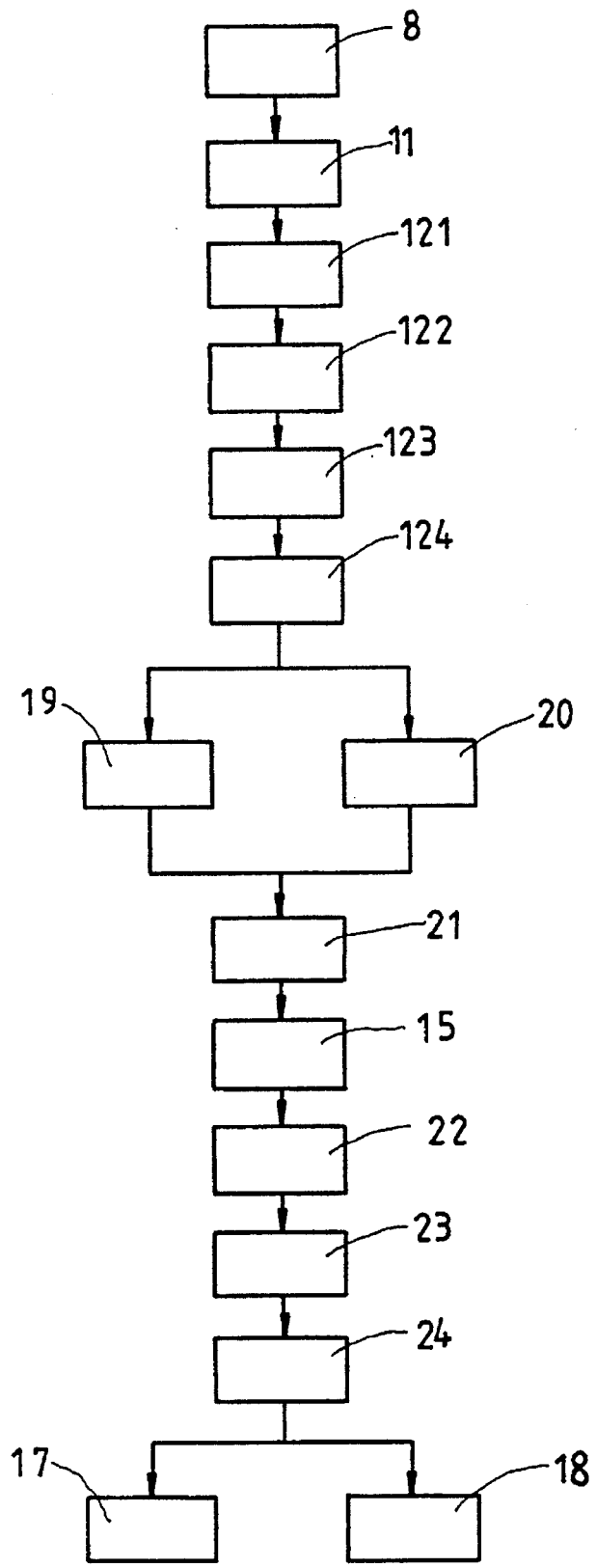
FIG. 2 is a flow chart of the process of the present invention to show the process of sintering of the broken type material.

FIG. 2 showing a flow chart of the sintering of the material (during processing of the broken type material), the process can be more clearly understood. When the material has been vacuum ejected by the process 8, it is dried by a drying kiln in the drying process 11 at a temperature of 250° C. for 9 minutes. The material is then broken with a shattering machine in a shattering process 121 into pieces, and is screened with a vibrating screen 122 to obtain grains between 25 mm–30 mm. The remaining material further is subjected to a further screening process 123, 124 to obtain graded grains less than 25 mm, i.e., course and fine grains 19, 20. The grains are preheated by a preheating process 21 in a preheating kiln with a temperature of 600° C. for about 5 minutes. The grains are then sintered in a sintering process 15 by an upright kiln of high temperature, between about 1,500°–1,700° C. most preferably for 15 minutes. After sintering into bulk stones, the stones are cooled in a cooling process 22 by a chilling kiln for about 2 minutes. The stones are then screened in a vibrating screening process 23 with a vibrating screening machine to form grades or specified course and fine stones. The stones are packed in a packing process 24 to complete the process of producing the environment conserving stones 17, 18.

Figure 3:
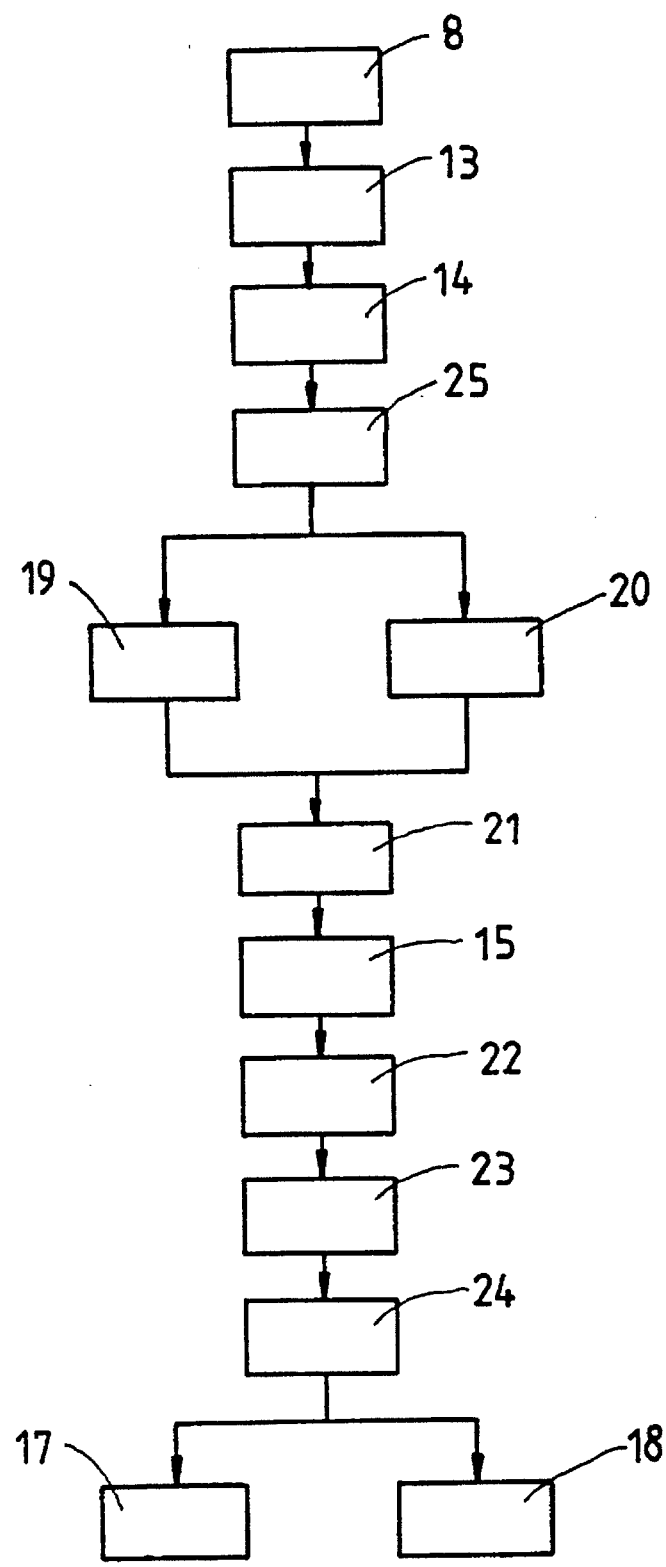
FIG. 3 is a flow chart of the process of the present invention to show the process of sintering of the modelling type material.

The flow chart of FIG. 3 illustrates an alternate embodiment of the present invention. When the modelling type material is vacuum ejected by the process 8, it is treated by a modelling process 13 with a modelling machine. The material is aggregated by the rotation of the machine, and forms ball-like environment conserving particles. The particles are then treated by a drying process 14, and then are divided in a vibrating screening process 25 with a vibrating screening machine to obtain coarse and fine particles. Thereafter, they are treated in the same way as the broken type material through a preheating process 21, a sintering process 15, a cooling process 22, a vibrating screening process 23, and a packing process 24 to form coarse and fine environment conserving stones 17, 18.

The environment conserving stones formed in the broken type and the modelling type processes have uniform compositions, so that the stones have higher strength and stability. As can be seen from the processes, the environment conserving stones sintered in a temperature over a thousand degrees are wholly sterile, and moreover, they are sintered in the high temperature after being broken. Their strength is much higher than that of natural stones, and thus can be used in pre-cast walls of reinforced concrete constructions. The stones can be used as stone additives in asphalt to strengthen the adhesive strength of an asphalt pavement and increase the useful life thereof.

Because the environment protecting stones of the present invention are produced from waste industrial earth and industrial waste, the problem of being unable to dispose of the industrial waste can be eliminated. This is advantageous to both industry and the environment.

My invention may assume numerous forms and is to be construed as including all modifications and variations falling within the scope of the appended claims.

I claim:

1. A process for sintering industrial waste into stones, comprising;
   (1) uniformly mixing waste industrial earth, said mixed waste industrial earth comprising red earth, black earth, reddish yellow earth and clay
   (2) uniformly mixing industrial waste, said mixed industrial waste comprising wood flour, waste paper pulp, waste mud, tea dregs, and waste oil;
   (3) uniformly mixing approximately equal parts of mixed waste industrial earth and mixed industrial waste to form stone material;
   (4) ball milling said stone material;
   (5) press filtering said stone material;
   (6) pugging said stone material so as to aggregate said stone material;
   (7) treating said stone material by a vacuum ejection process to coagulate said stone material;
   (8) drying said coagulated stone material at a temperature of 250° C. for 9 minutes to remove water of crystallization, thus forming said stone material into lumps;
   (9) breaking said lumps into uniform grains;
   (10) preheating said grains for approximately 5 minutes to 600° C.;
   (11) sintering said preheated grains at 1,500° C. for approximately 15 minutes so as to form stones;
   (12) cooling said sintered stones in a chilling kiln for about 2 minutes; and
   (13) screening said stones to separate said stones by size.

2. A process for sintering industrial waste into stones, comprising;
   (1) uniformly mixing waste industrial earth, said mixed waste industrial earth comprising red earth, black earth, reddish yellow earth and clay
   (2) uniformly mixing industrial waste, said mixed industrial waste comprising wood flour, waste paper pulp, waste mud, tea dregs, and waste oil;
   (3) uniformly mixing approximately equal pads of mixed waste industrial earth and mixed industrial waste to form stone material;
   (4) ball milling said stone material;
   (5) press filtering said stone material;
   (6) pugging said stone material so as to aggregate said stone material;
   (7) treating said stone material by a vacuum ejection process to coagulate said stone material;
   (8) aggregating said stone material into lumps;
   (9) treating said stone material with a modelling process to render said stone material into uniform balls;
   (10) drying said uniform balls;
   (11) sintering said uniform balls into stones;
   (12) screening said stones to separate said stones by size.

* * * * *